(12) United States Patent
Benden et al.

(10) Patent No.: US 8,303,011 B2
(45) Date of Patent: Nov. 6, 2012

(54) PATIENT TRANSPORT VEHICLE

(75) Inventors: Mark E. Benden, College Station, TX (US); Eric K. Wilke, College Station, TX (US)

(73) Assignee: The Texas A&M University System, College Station, TX (US)

( * ) Notice: Subject to any disclaimer, the term of this patent is extended or adjusted under 35 U.S.C. 154(b) by 299 days.

(21) Appl. No.: 12/655,721

(22) Filed: Jan. 6, 2010

(65) Prior Publication Data

US 2010/0213731 A1 Aug. 26, 2010

Related U.S. Application Data

(60) Provisional application No. 61/204,491, filed on Jan. 7, 2009.

(51) Int. Cl.
*B60J 7/00* (2006.01)
(52) U.S. Cl. ............................ 296/19; 5/626; 280/769
(58) Field of Classification Search ............ 296/19; 5/626; 280/769
See application file for complete search history.

(56) References Cited

U.S. PATENT DOCUMENTS

| | | | | |
|---|---|---|---|---|
| 4,212,485 A | * | 7/1980 | Kramb | 280/766.1 |
| 5,509,710 A | * | 4/1996 | Eavenson et al. | 296/19 |
| 5,702,142 A | * | 12/1997 | Newell | 296/19 |
| 7,549,661 B2 | * | 6/2009 | Jackson et al. | 280/204 |

* cited by examiner

*Primary Examiner* — Joseph Pape
(74) *Attorney, Agent, or Firm* — Benjamin Aaron Adler

(57) ABSTRACT

The present invention provides an emergency medical transportation vehicle comprising a two or three-wheeled motorcycle having a structural frame that encompasses a platform horizontally disposed along the wheel-base, where the platform has a front flat surface, and two rear surfaces extending from the front flat surface on either side of the rear wheel. The rear surfaces have sides extending vertically therefrom. The motorcycle carries the load of driver and patient, provides a safe, stable patient transportation, where passenger and rider are in one plane with the rider below and in complete view of the driver. The vehicle has a movable seat for the driver and chambers for placement of emergency medical equipment and supplies.

31 Claims, 9 Drawing Sheets

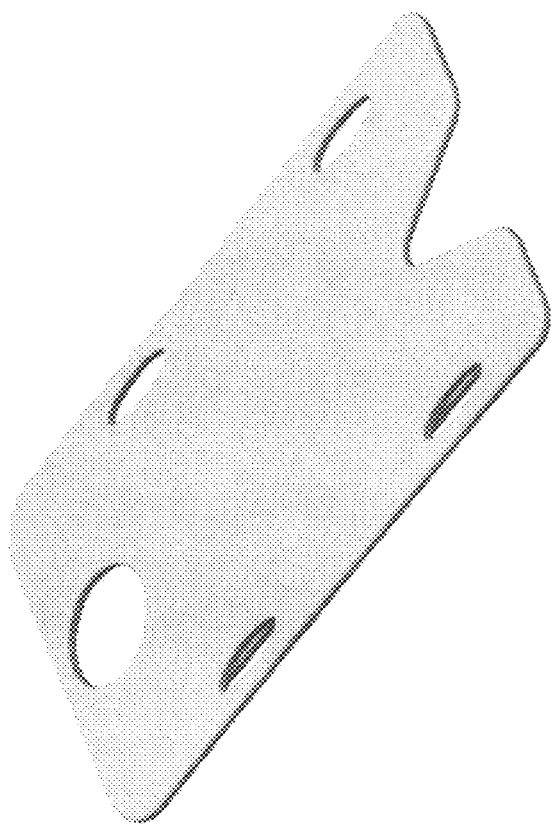
Fig. 3A
Fig. 3B

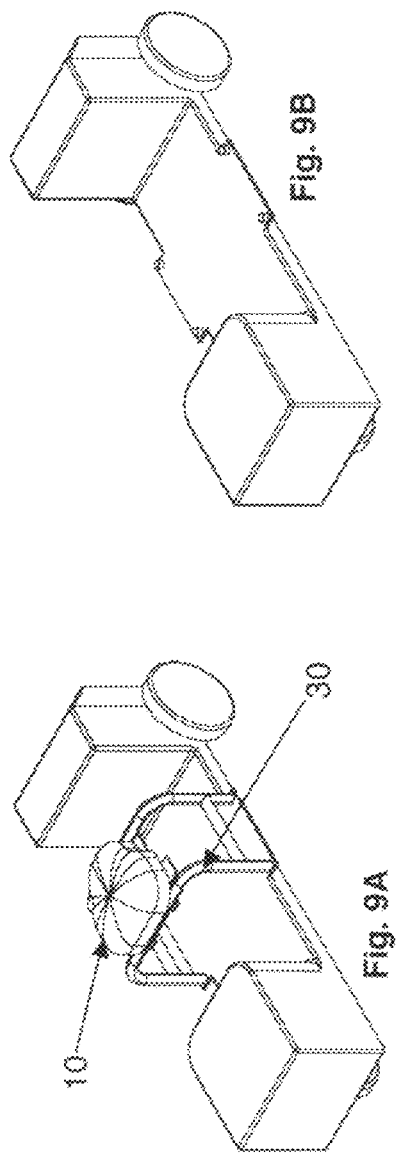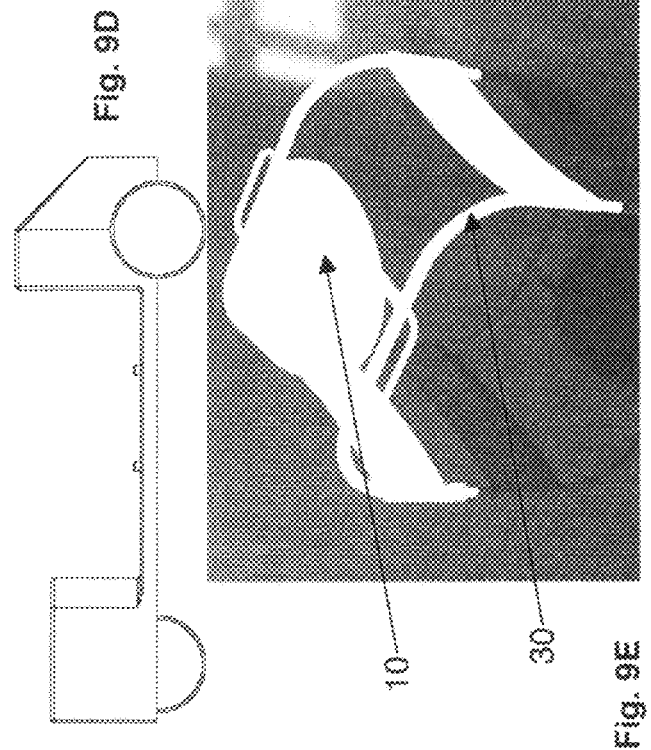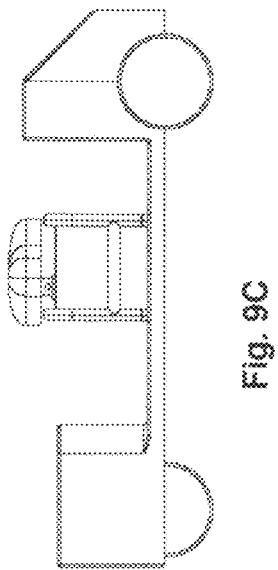

PATIENT TRANSPORT VEHICLE

CROSS-REFERENCE TO RELATED APPLICATION

This non-provisional patent application claims benefit of priority under 35 U.S.C. §119(e) of provisional U.S. Ser. No. 61/204,491, filed Jan. 7, 2009, now abandoned, the contents of which are incorporated in entirety herein.

BACKGROUND OF THE INVENTION

1. Field of the Invention

The present invention relates generally to the fields of emergency is medical transportation in areas with poor emergency medical services, high-traffic congestion or poor road conditions. More specifically, the present invention relates to a motorized vehicle that maintains the patient and driver in one plane, with patient below and in complete view of the driver.

2. Description of the Related Art

Commonly, air evacuation and four-wheel ambulance are used for emergency medical transportation in developed areas with adequate roads and funding. In underdeveloped areas and congested urban environments inexpensive solutions are needed for emergency and non-emergency transportation. Currently bikes with trailers and motorcycles with sidecars are used. However, trailers and bikes are a poor combination for modern roads and motorized vehicular traffic. Motorcycle sidecars possess the inconvenience of width (almost equal to a car) and poor handling due to unequal weight distribution caused by the patient's position. The use of helicopters is expensive and impractical in urban areas due to buildings and overhead lines.

In time-critical disorders like cardiac arrest, myocardial infarction, severe respiratory disease and polytrauma, immediate response from the Emergency Medical Service (EMS) is crucial and the fastest means of transport to the patient must be chosen. Recently, due to the relatively long response times for car ambulances in urban traffic, the use of medical emergency motorcycles (MEM) has been advocated. Motorcycles have a significantly shorter response time than a regular ambulance. Motorcycles can also respond to locations where responding conventional ambulances are obstructed by traffic congestion, or cannot be readily responded to by a conventional ambulance due to non-availability in the area, or at locations where access by conventional ambulance is prohibited due to road configuration, construction etc.

Currently, motorcycle medics provide pre-hospital paramedical care to patients suffering from major trauma, chronic obstructive airway disease, asthma, diabetes mellitus, cardiac disease and unconscious patients by applying comprehensive patient assessment, cardiac care by cardiopulmonary resuscitation and defibrillation, intravenous/intramuscular injection therapy, and use of selected drugs. However, these medical emergency motorcycles are limited to "Treat in Place" until a conventional ambulance arrives to transport the patient/victim. Currently, medical emergency motorcycles are not equipped to transport the victim.

There is a need in the art for emergency medical transportation that is not cumbersome, inexpensive and short in length as compared to trailers while enabling the constant observation of patient status. Specifically, the prior art is deficient in a vehicle that keeps the patient and driver in one plane, thus enabling constant visual monitoring, said vehicle being a similar width as a standard motorcycle, inexpensive with low retail and operational cost and easy to control. The prior art does not provide an emergency medical transport with the capacity to transport the patient, while continuing to provide all advantages of the motorcycle medics who currently have to "Treat in Place" until a 4 wheeled-box ambulance arrives. The present invention fulfills this long-standing need and desire in the art. The present invention can serve as a primary medical transport in many developing nations, and in developed areas, it can be as valuable as needed in case of time sensitive emergencies, disasters and mass-casualty events.

SUMMARY OF THE INVENTION

The present invention is directed to a vehicle used for emergency medical transportation. Generally, the vehicle comprises a motorcycle having a step-through structural frame with: a platform horizontally disposed along the wheelbase. The platform has a front flat surface, and two rear surfaces extending from the front flat surface on either side of the rear wheel, the rear surfaces bracketed by sides extending vertically therefrom; and a movable seat for the driver.

The vehicle of the instant invention also has spine-board or mesh for patient transportation and recline. The vehicle also comprises locking mechanisms for securing full-body slings or split-leg slings. In certain embodiments, the structural frame comprises containers useful for retaining bottles, such as oxygen containers, on the structural frame. Chambers are also enclosed at the rear end of the vehicle for storage of automated external defibrillator, Kendrick Extrication Device, cervical collar and other emergency medical supplies.

Other and further aspects, features, and advantages of the present invention will be apparent from the following description of the presently preferred embodiments of the invention. These embodiments are given for the purpose of disclosure.

BRIEF DESCRIPTIONS OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

FIGS. 3A-3B are multiple views of a spine-board that allows for full recline or partial recline of the patient.

FIGS. 9A-9E are multiple views of a removable seat design mounted on a simplified motorcycle model having a step-through structural frame. The seat is mounted to a seat-frame that is detachable from the vehicle.

DETAILED DESCRIPTION OF THE INVENTION

Figure 1:
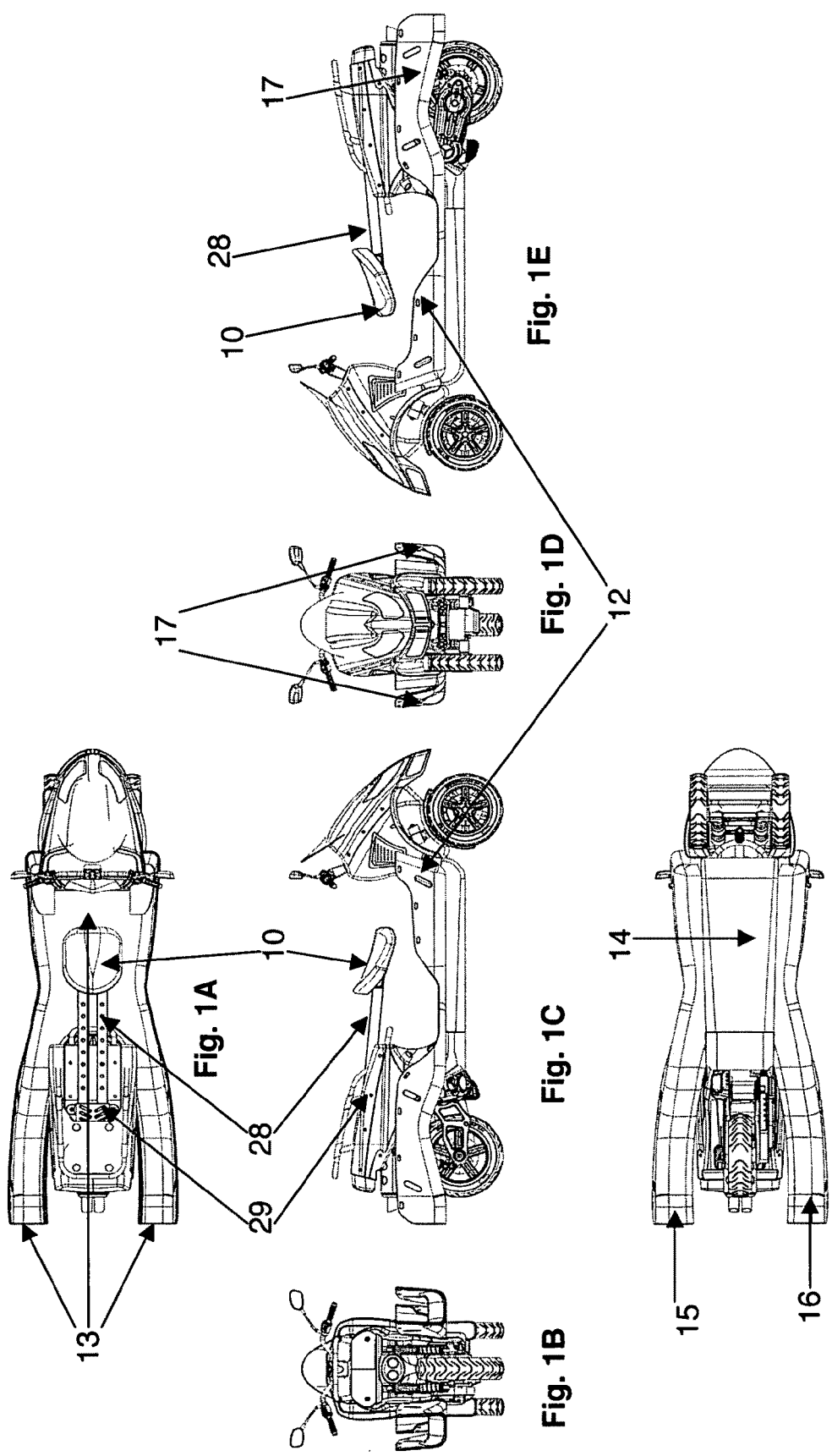
FIGS. 1A-1F are multiple views of an emergency medical transportation vehicle comprising a three-wheeled motorcycle. The views depict the structural frame that is designed to carry the load of driver and patient and provide a safe, stable means of patient transportation.

The present invention is directed to a vehicle used for emergency medical transportation. The vehicle comprises a motorcycle having a step-through structural frame with: a platform horizontally disposed along the wheel-base, wherein the platform has a front flat surface, and two rear surfaces extending from the front flat surface on either side of the rear wheel, the rear surfaces bracketed by sides extending vertically therefrom; and a movable seat for the driver.

In certain embodiments of the instant invention, the seat for the driver is mounted to a seat-frame attached to rollers supported by rails on the sides of the vehicle, and the seat slides on said rails into a compartment at the front of the vehicle. In certain other embodiments, the seat is mounted to one end of a cantilever beam that is attached at the other end to the front section of the vehicle by means of a hinge, and wherein the seat can be flipped forward and upward by up to 90 degrees.

In some embodiments of the instant invention, the seat is mounted to one end of a cantilever beam that is attached at the other end to the rear section of the vehicle by means of a hinge, and the seat can be flipped backward by up to 180 degrees. In some other embodiments, the seat is mounted to a telescoping cantilever beam that retracts into a molded recess within the rear section of the vehicle.

In certain preferred embodiments of the instant invention, the seat is mounted to a seat-frame that is detachable from the vehicle. In some of these embodiments, the seat-frame is attached to the vehicle by means of quick release mechanism. In certain of these embodiments, side-panels are attached to the sides of the seat-frame. These side-panels shield the patient's torso from external impact. These side-panels may be manufactured from plastic or fiberglass. In certain of these embodiments, the seat-frame is made of steel. In some embodiments, a belt is attached to the seat-frame. This belt is useful to restrain and completely contain the patient on the platform. In certain other embodiments, a cover is removably attached to the seat-frame. In certain embodiments, this cover is manufactured from plastic, fiber glass, canvas or a synthetic fabric.

In certain embodiments of the invention, a spine-board is removably attached to the platform. The spine-board has a thickness between 1 inch to 3 inches, a width between 12 inches to 24 inches, and a length of 30 inches to 45 inches. In certain other embodiments, a removable flexible mesh is attached to the platform; the mesh having a width between 12 inches to 30 inches and a length of 30 inches to 65 inches. In certain embodiments, this flexible mesh may be manufactured from nylon or any suitable material as would be readily recognized by one having ordinary skill in this art.

In certain embodiments of the invention, a locking mechanism is attached on both sides of the front end of the structural frame and on both sides of the rear end of the structural frame. These locking mechanisms secure a sling. In some of these embodiments, the sling is between 50 inches to 70 inches in length and 40 inches to 50 inches in width. In certain embodiments, the sling is a full-body sling. In certain other embodiments, the sling is a split leg sling.

In certain embodiments of the present invention, the structural frame comprises containers useful for retaining, for example but not limited to, oxygen bottles on the structural frame. In certain embodiments are enclosed chambers at the rear end of the vehicle for storage of automated external defibrillator, Kendrick Extrication Device, cervical collar and other emergency medical supplies.

In certain preferred embodiments of the instant invention, a helmet is removably attached to the front flat surface of platform. The helmet preferably includes or comprises an audio receiver and a microphone thus allowing communication between driver and patient.

In certain preferred embodiments, the motorcycle has at least three wheels. In certain embodiments of the invention, the vehicle is powered by electricity, solar, internal combustion engine or combinations thereof. In some embodiments, an additional seat is attached to the rear of said driver's seat. In certain embodiments, a cover is removably attached to the sides of each rear surface of the platform.

As used herein, the term, "a" or "an" may mean one or more. As used herein in the claim(s), when used in conjunction with the word "comprising", the words "a" or "an" may mean one or more than one. As used herein "another" or "other" may mean at least a second or more.

Embodiments of the present invention may be best illustrated with reference to the Figures, however, such reference is not meant to limit the present invention in any fashion. The embodiments and variations described in detail herein are to be interpreted by the appended claims and equivalents thereof.

FIGS. 1A-1F depict one embodiment of an emergency medical transportation vehicle comprising a three-wheeled motorcycle. The motorcycle seat 10 is mounted to a telescoping cantilever beam 28 that retracts into a molded recess 29 within the rear section of the vehicle. The structural frame 12 is a step-through structural frame with: a platform 13 horizontally disposed along the wheel-base, wherein said platform has a front flat surface 14, and two rear surfaces 15-16 extending from said front flat surface on either side of the rear wheel, the rear surfaces bracketed by sides 17 extending vertically therefrom.

Figure 2:
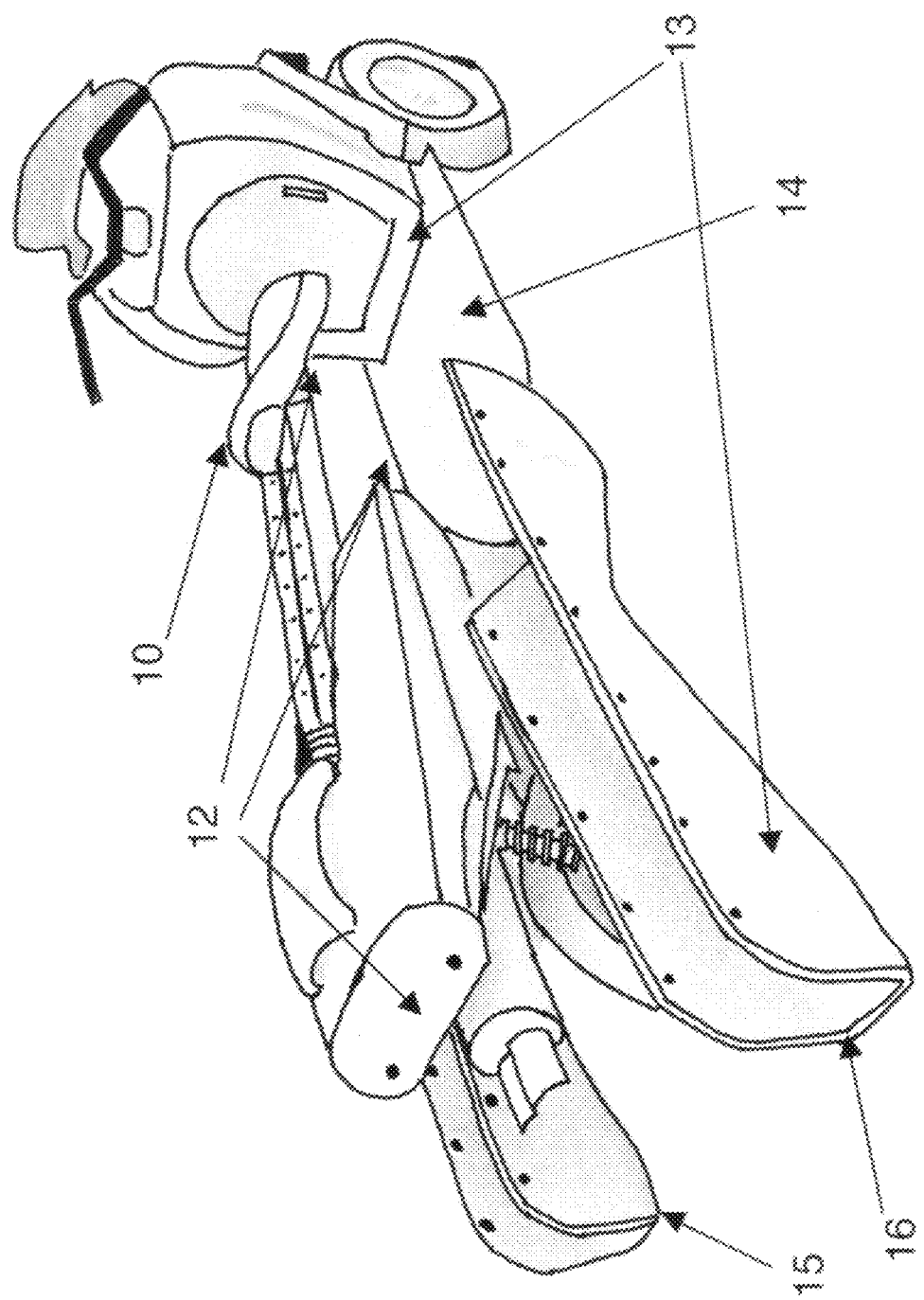
FIG. 2 is the side view of an emergency medical transportation vehicle comprising a two-wheeled motorcycle.

FIG. 2 depicts one embodiment of an emergency medical transportation vehicle comprising a two-wheeled motorcycle. The motorcycle seat 10 is mounted to a telescoping cantilever beam that retracts into a molded recess within the rear section of the vehicle. The structural frame 12 is a step-through structural frame with a platform 13 horizontally disposed along the wheel-base, wherein the platform has a front flat surface 14, and two rear surfaces 15-16 extending from the front flat surface on either side of the rear wheel, the rear surfaces bracketed by sides 17 extending vertically therefrom.

FIGS. 3A-3B depict a spine-board that allows for full recline or partial recline of the patient. The spine-board is placed on the front flat surface 14, described supra. FIG. 3A depicts the top view of the spine-board that allows recline of the patient. FIG. 3B depicts the side view of the spine-board placed in full recline position.

Figure 4A:
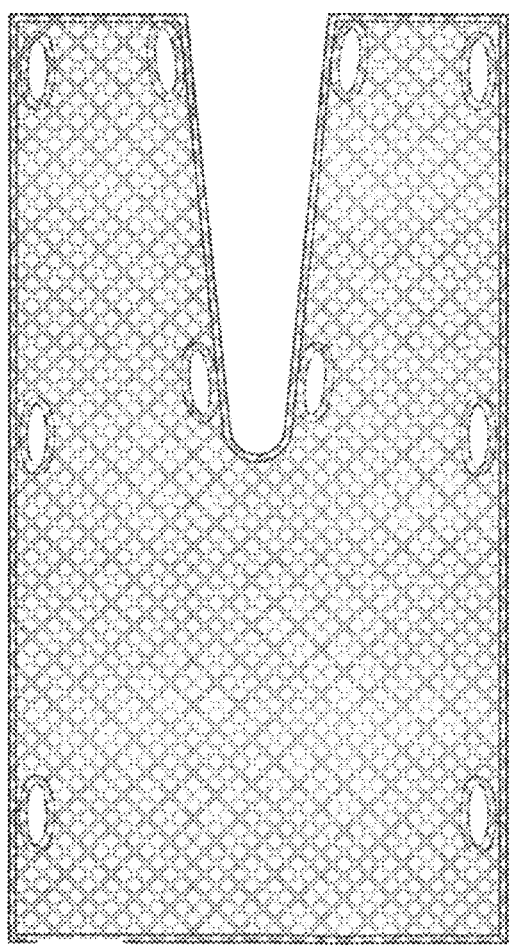
FIGS. 4A-4B are multiple views of a flexible mesh, that allows for full recline or partial recline of the patient.
Figure 4B:
Figure 5B:
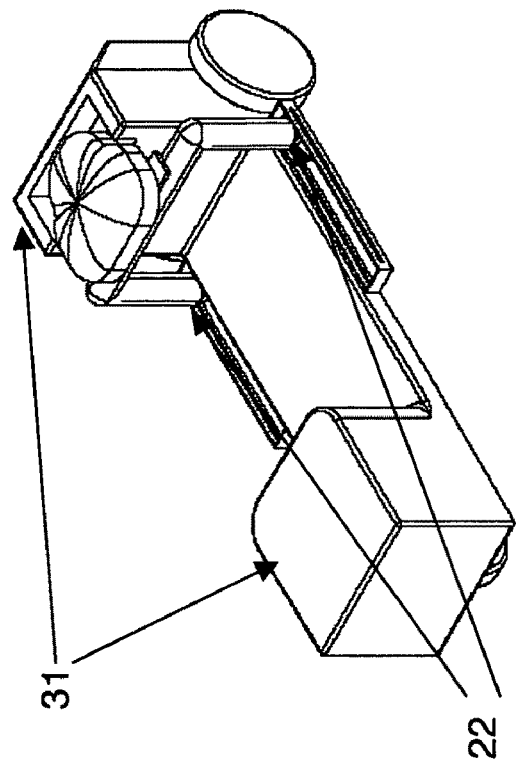
FIGS. 5A-5D are multiple views of a forward sliding seat design mounted on a simplified motorcycle model having a step-through structural frame. The seat for the driver is mounted to a seat-frame attached to rollers supported by rails on the sides of the vehicle, and the seat slides on said rails into a compartment at the front of the vehicle.
Figure 5D:
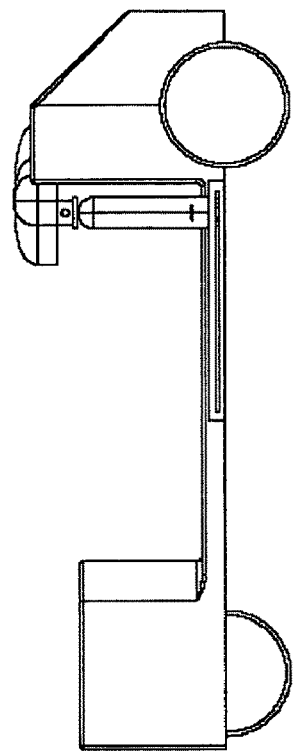
Figure 5A:
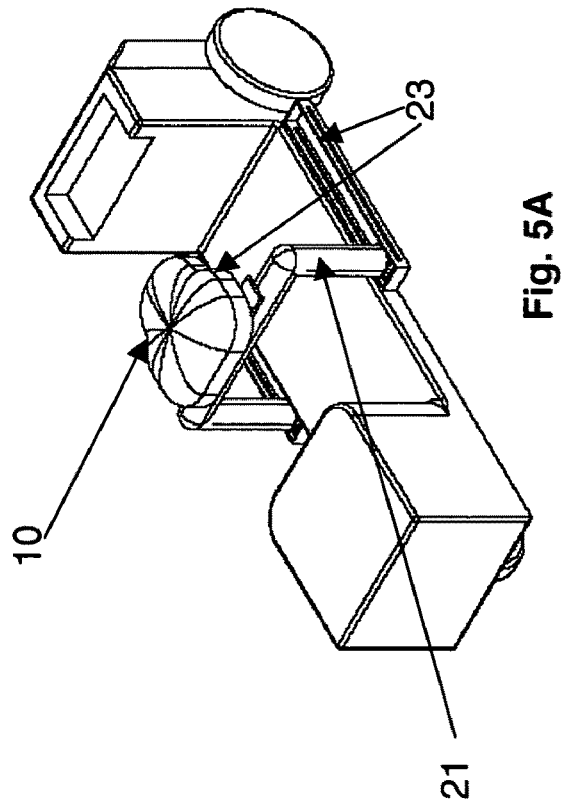
Figure 5C:
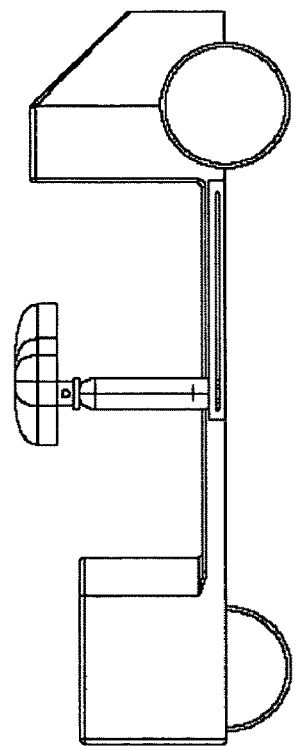
Figure 6B:
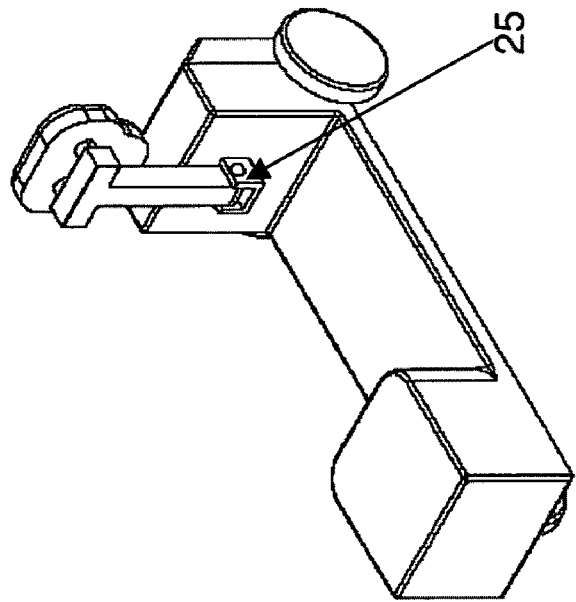
FIGS. 6A-6D are multiple views of a flip-up beam design mounted on a simplified motorcycle model having a step-through structural frame. The seat is mounted to one end of a cantilever beam that is attached at the other end to the front section of the vehicle by means of a hinge, and the seat can be flipped forward and upward by up to 90 degrees.
Figure 6D:
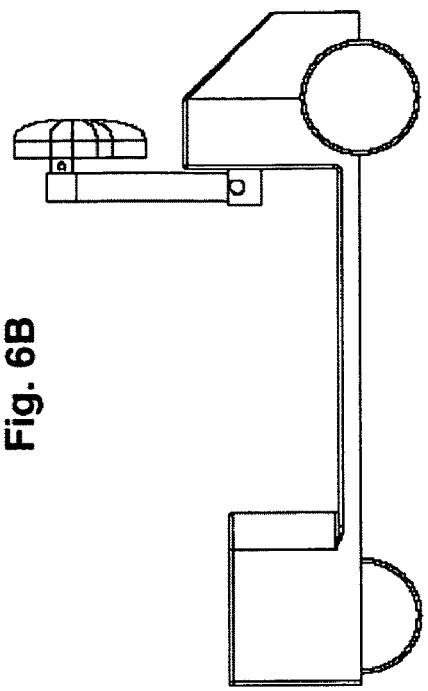
Figure 6A:
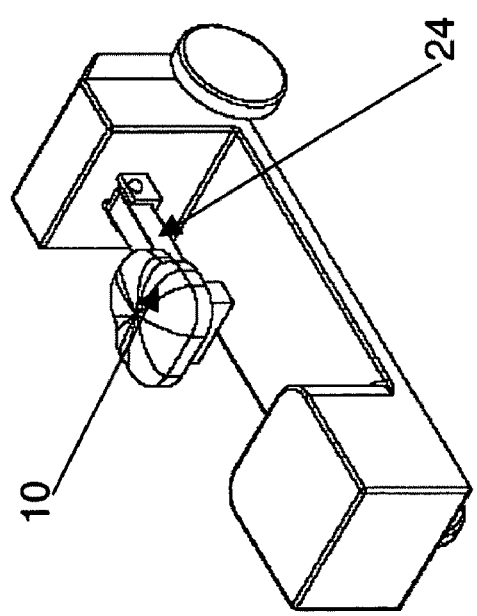
Figure 6C:
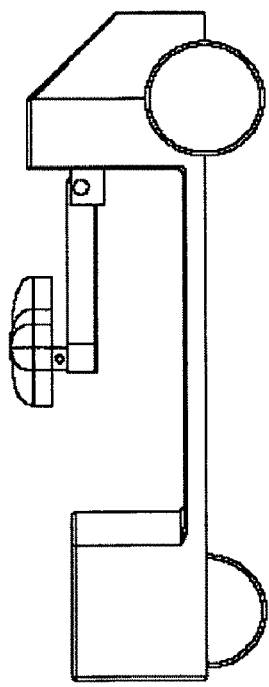
Figure 7B:
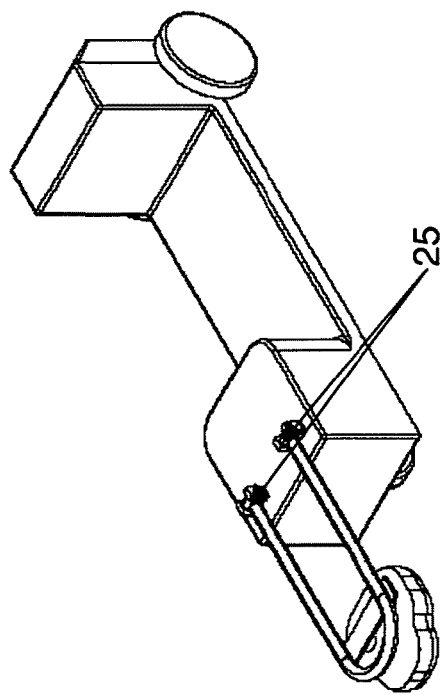
FIGS. 7A-7D are multiple views of a flip Back seat design mounted on a simplified motorcycle model having a step-through structural frame. The seat is mounted to one end of a cantilever beam that is attached at the other end to the rear section of the vehicle by means of a hinge, and the seat can be flipped backward by up to 180 degrees.
Figure 7D:
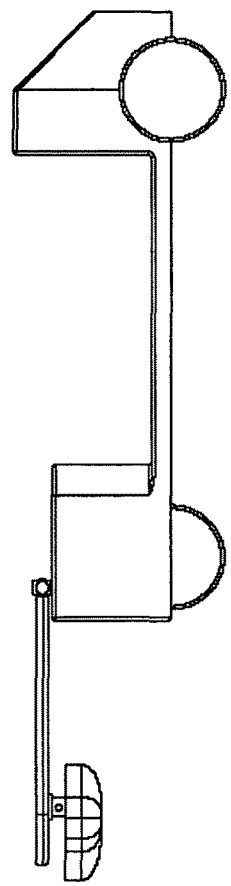
Figure 7A:
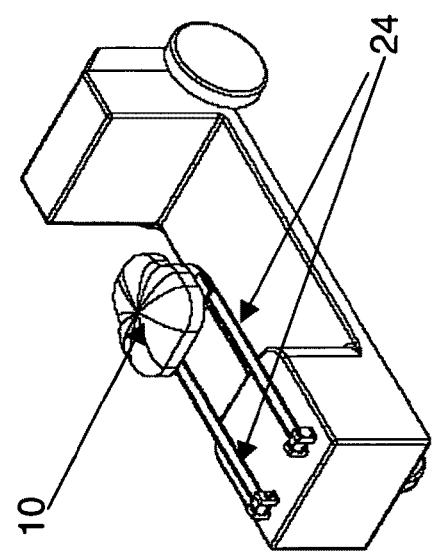
Figure 7C:
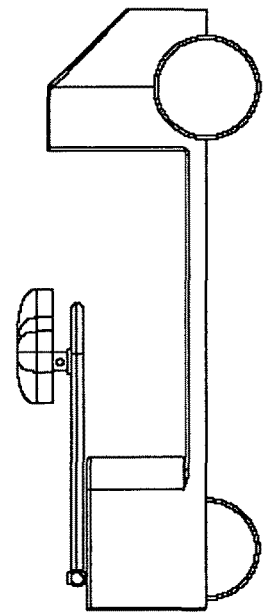
Figure 8A:
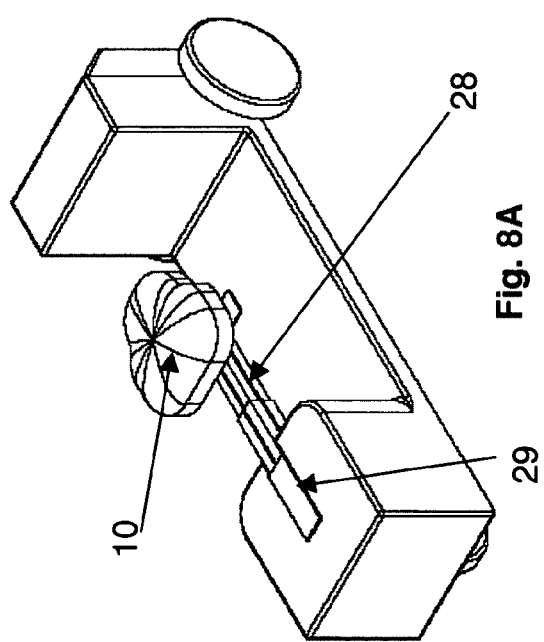
FIGS. 8A-8D are multiple views of a telescoping seat design mounted on a simplified motorcycle model having a step-through structural frame. The seat is mounted to a telescoping cantilever beam that retracts into a molded recess within the rear section of the vehicle.
Figure 8B:
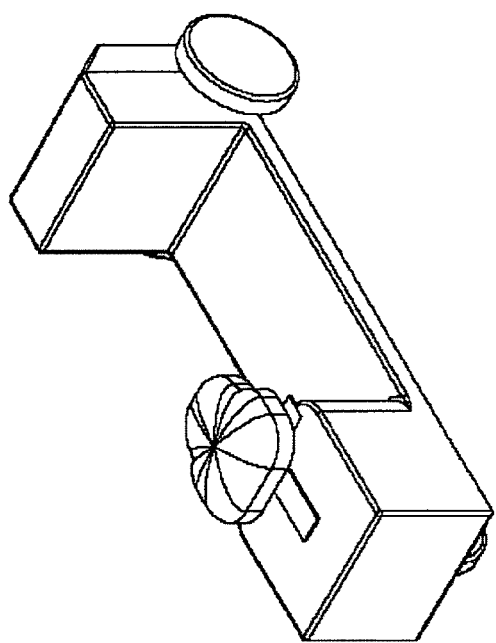
Figure 8C:
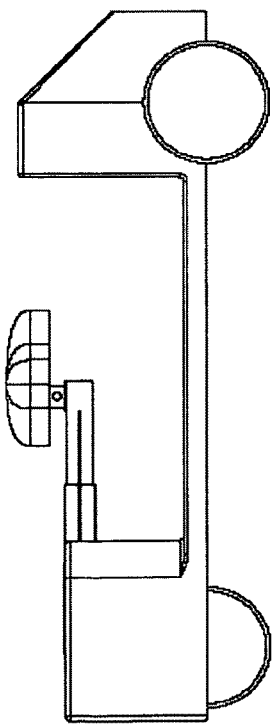
Figure 8D:
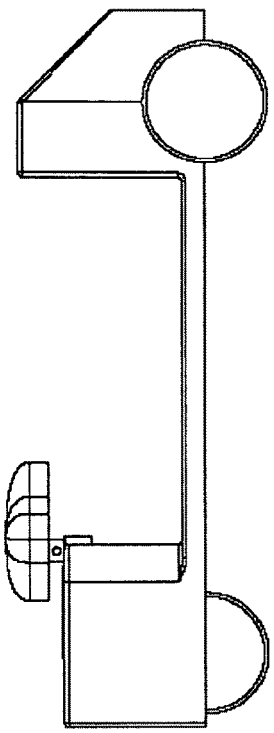

FIGS. 4A-4B depict a flexible mesh that allows for full recline or partial recline of the patient. The mesh is placed on the front flat surface 14, described supra. FIG. 4A depicts the top view of the mesh that allows recline of the patient. FIG. 4B depicts the side view of the mesh placed in full recline position.

FIGS. 5A-9E depict different arrangements or embodiments of the seat 10. FIGS. 5A-5D are multiple views of a forward sliding seat 10 mounted on a simplified motorcycle model 31 having a step-through structural frame. The seat for the driver is mounted to a seat-frame 21 attached to rollers 22 supported by rails 23 on the sides of the vehicle, and the seat slides on the rails into a compartment at the front of the vehicle.

FIGS. 6A-6D depict the seat 10 mounted to one end of a cantilever beam 24 that is attached at the other end to the front section of the vehicle by means of a hinge 25, and the seat can be flipped forward and upward by up to 90 degrees.

In FIGS. 7A-7D, the seat 10 is mounted to one end of a cantilever beam 26 that is attached at the other end to the rear section of the vehicle by means of a hinge 27, and the seat can be flipped backward by up to 180 degrees.

FIGS. 8A-8D depict the seat 10 mounted to a telescoping cantilever beam 28 that retracts into a molded recess 29 within the rear section of the vehicle.

FIGS. 9A-9E depict a removable seat 10 mounted on a simplified motorcycle model 31 having a step-through structural frame. The seat is mounted to a seat-frame 30 that is detachable from the vehicle.

Any patents or publications mentioned in this specification are indicative of the levels of those skilled in the art to which the invention pertains. Further, these patents and publications are incorporated by reference herein to the same extent as if each individual publication was specifically and individually incorporated by reference.

One skilled in the art will appreciate readily that the present invention is well adapted to carry out the objects and obtain the ends and advantages mentioned, as well as those objects, ends and advantages inherent herein. Changes therein and other uses which are encompassed within the spirit of the invention as defined by the scope of the claims will occur to those skilled in the art.

What is claimed is:

1. An emergency medical transport vehicle, comprising:
a motorcycle having a step-through structural frame;
a platform horizontally disposed along a wheel-base, wherein said platform has a front flat surface, and two rear surfaces extending from said front flat surface on either side of a rear wheel, said rear surfaces each having sides extending vertically therefrom along the wheel-base; and
a movable seat for a driver.

2. The vehicle of claim 1, further comprising belts attached to the platform.

3. The vehicle of claim 1, wherein said seat for the driver is mounted to a seat-frame attached to rollers supported by rails on sides of the vehicle, and wherein the seat slides on said rails into a compartment at the front of the vehicle.

4. The vehicle of claim 1, wherein said seat is mounted to one end of a cantilever beam that is attached at the other end to a front section of the vehicle by means of a hinge, and wherein the seat can be flipped forward and upward by up to 90 degrees.

5. The vehicle of claim 1, wherein said seat is mounted to one end of a cantilever beam that is attached at the other end to a rear section of the vehicle by means of a hinge, and wherein the seat can be flipped backward by up to 180 degrees.

6. The vehicle of claim 1, wherein said seat is mounted to a telescoping cantilever beam that retracts into a molded recess within a rear section of the vehicle.

7. The vehicle of claim 1, wherein said seat is mounted to a seat-frame that is detachable from the vehicle.

8. The vehicle of claim 7, wherein the seat-frame is attached to the vehicle by a quick release mechanism.

9. The vehicle of claim 7, wherein said seat-frame is made of steel.

10. The vehicle of claim 7, wherein side-panels are attached to the sides of the seat-frame.

11. The vehicle of claim 10, wherein the side-panels are manufactured from plastic.

12. The vehicle of claim 7, wherein a belt is attached to the seat-frame.

13. The vehicle of claim 7, wherein a cover is removably attached to said seat-frame.

14. The vehicle of claim 12, wherein said cover for said seat-frame is manufactured from plastic, fiber glass, canvas or a synthetic fabric.

15. The vehicle of claim 1, wherein a spine-board is removably attached to the platform; said spine-board having a thickness between 1 inch to 3 inches, a width between 12 inches to 24 inches, and a length of 30 inches to 45 inches.

16. The vehicle of claim 6, further comprising a removable flexible mesh attached to the platform, said mesh having a width between 12 inches to 30 inches and a length of 30 inches to 65 inches.

17. The vehicle of claim 16, wherein said flexible mesh is manufactured from nylon.

18. The vehicle of claim 1, further comprising a locking mechanism on both sides of a front end of the step-through structural frame and a locking mechanism on both sides of a rear end of the step-through structural frame; wherein said locking mechanism secures a sling.

19. The vehicle of claim 18, wherein said sling is between 50 inches to 70 inches in length and 40 inches to 50 inches in width.

20. The vehicle of claim 18, wherein the sling is a full-body sling.

21. The vehicle of claim 18, wherein the sling is a split leg sling.

22. The vehicle of claim 1, further comprising hooks on said step-through structural frame.

23. The vehicle of claim 1, further comprising containers useful for retaining oxygen bottles on the step-through structural frame.

24. The vehicle of claim 1, comprising enclosed chambers at a rear end of the vehicle for storage of automated external defibrillator, Kendrick Extrication Device, cervical collar and other emergency medical supplies.

25. The vehicle of claim 1, further comprising a hands-free communication system.

26. The vehicle of claim 1, wherein a helmet is removably attached to the front flat surface of the platform, said helmet comprising an audio receiver and a microphone.

27. The vehicle of claim 1, wherein said motorcycle has at least three wheels.

28. The vehicle of claim 1, wherein said motorcycle is powered by electricity, solar, internal combustion engine or combinations thereof.

29. The vehicle of claim 1, further comprising an additional seat attached to the rear of said driver's seat.

30. The vehicle of claim 1, wherein a cover is removably attached to the sides of each rear surface of the platform.

31. An emergency medical transport vehicle, comprising:
a motorcycle having a step-through structural frame;
a platform horizontally disposed along a wheel-base, wherein said platform has a front flat surface, and two rear surfaces extending from said front flat surface on either side of a rear wheel, said rear surfaces each having sides extending vertically therefrom along the wheel-base; and
a movable seat for a driver that is detachably mounted to a seat-frame.

* * * * *